Sept. 9, 1924. Re. 15,915

P. STEINBOCK

SELF LUBRICATING DUSTPROOF SEWING MACHINE

Original Filed May 25, 1920 7 Sheets-Sheet 1

Inventor
PHILIP STEINBOCK
By his Attorney
M. A. Lockwood

Sept. 9, 1924. Re. 15,915
P. STEINBOCK
SELF LUBRICATING DUSTPROOF SEWING MACHINE
Original Filed May 25, 1920 7 Sheets sheet 2
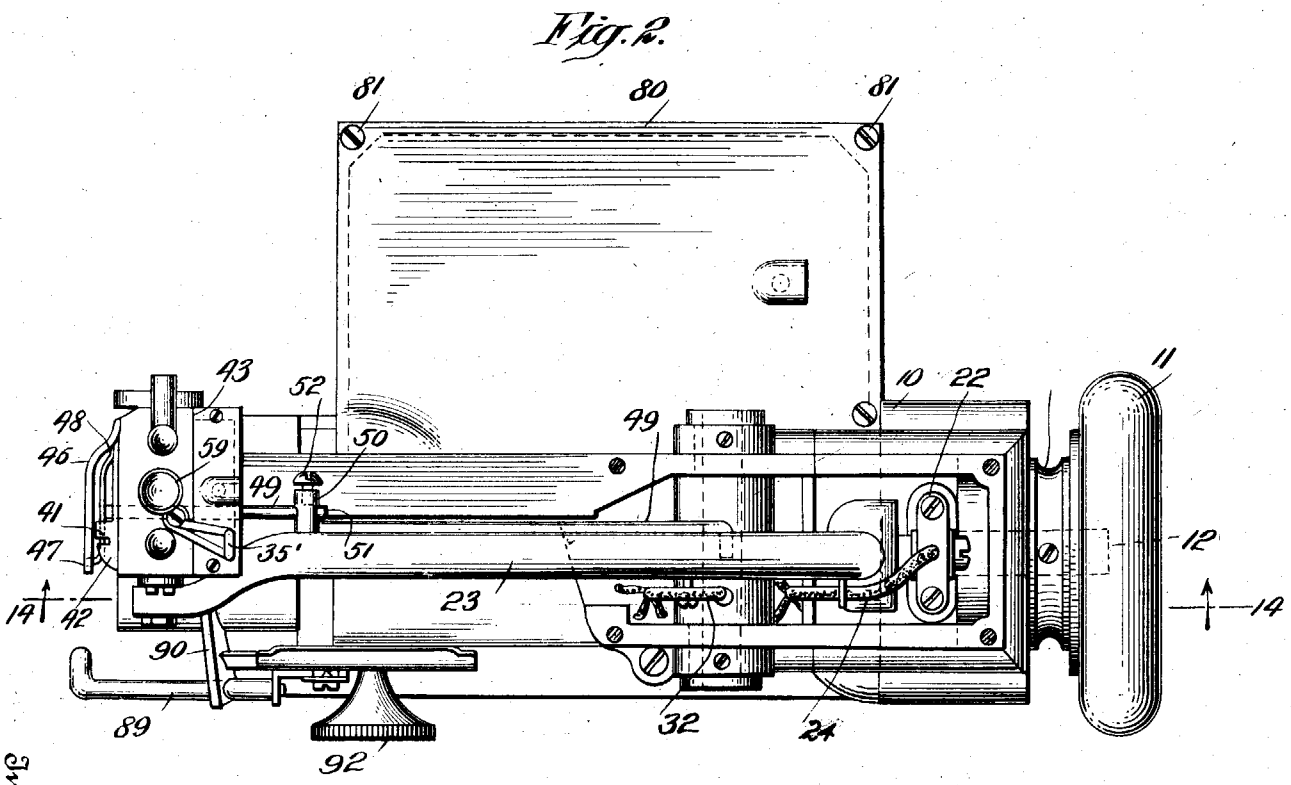
Inventor
PHILIP STEINBOCK
By his Attorney
M. H. Lockwood Sept. 9, 1924. Re. 15,915

P. STEINBOCK

SELF LUBRICATING DUSTPROOF SEWING MACHINE

Original Filed May 25, 1920 7 Sheets-Sheet 3

Inventor
PHILIP STEINBOCK
By his Attorney
M. H. Lockwood

Sept. 9, 1924. Re. 15,915

P. STEINBOCK

SELF LUBRICATING DUSTPROOF SEWING MACHINE

Original Filed May 25, 1920 7 Sheets-Sheet 4

Inventor
PHILIP STEINBOCK
By his Attorney
W. H. Lockwood

Sept. 9, 1924.

Re. 15,915

P. STEINBOCK

SELF LUBRICATING DUSTPROOF SEWING MACHINE

Original Filed May 25, 1920 7 Sheets-Sheet 5

Inventor
PHILIP STEINBOCK
By his Attorney
M. H. Lockwood

Sept. 9, 1924. Re. 15,915
P. STEINBOCK
SELF LUBRICATING DUSTPROOF SEWING MACHINE
Original Filed May 25, 1920 7 Sheets-Sheet 6
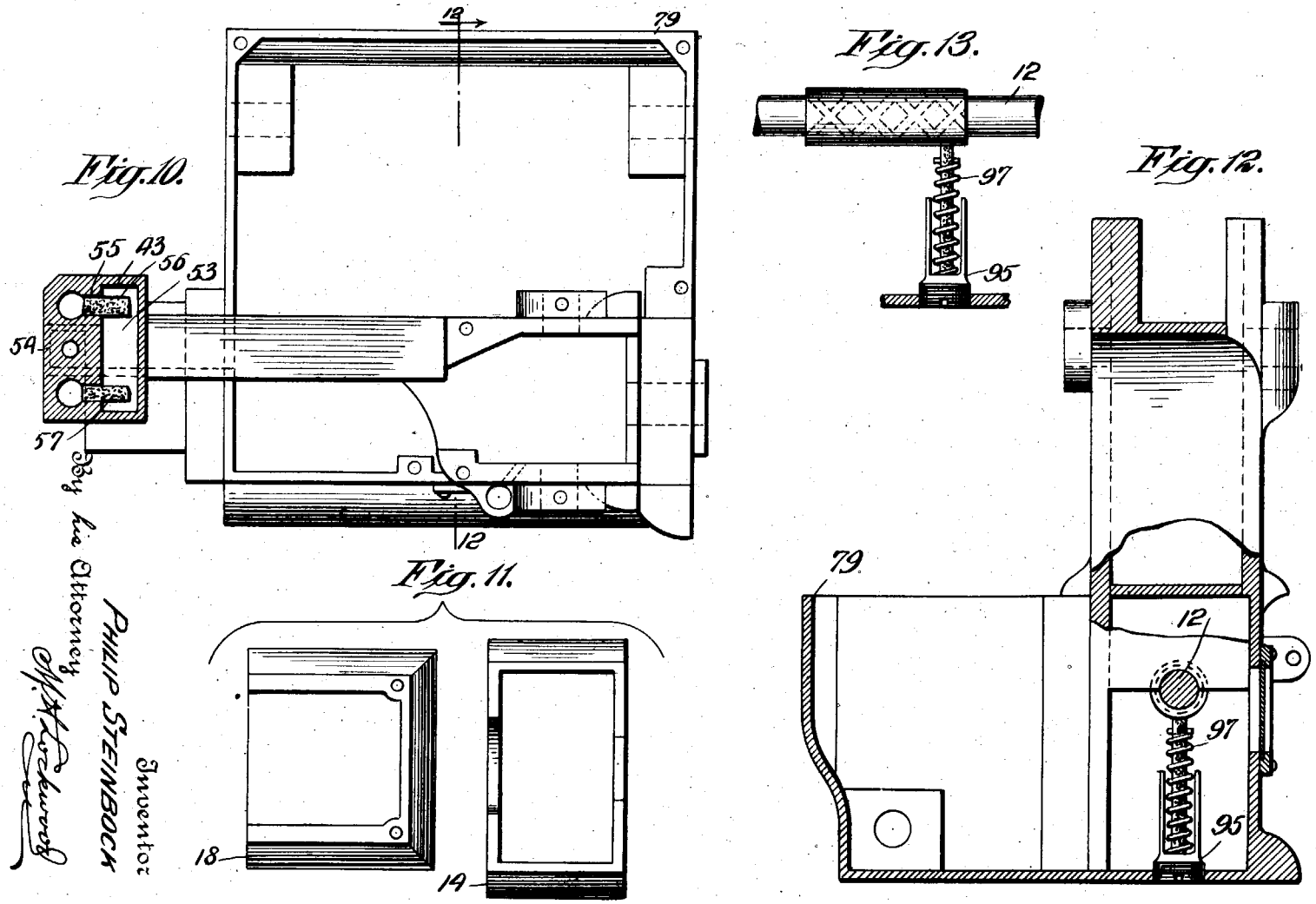
Inventor
PHILIP STEINBOCK
By his Attorney
M. A. Lockwood Sept. 9, 1924.

P. STEINBOCK

Re. 15,915

SELF LUBRICATING DUSTPROOF SEWING MACHINE

Original Filed May 25, 1920 7 Sheets-Sheet 7

Inventor
PHILIP STEINBOCK
By his Attorney
H. A. Lockwood

Reissued Sept. 9, 1924. Re. 15,915

UNITED STATES PATENT OFFICE.

PHILIP STEINBOCK, OF AMITYVILLE, NEW YORK, ASSIGNOR TO STEINBOCK SEWING MACHINE CORPORATION, OF NEW YORK, N. Y., A CORPORATION OF NEW YORK.

SELF-LUBRICATING DUSTPROOF SEWING MACHINE.

Original No. 1,380,120, dated May 31, 1921, Serial No. 384,027, filed May 25, 1920. Application for reissue filed May 23, 1923. Serial No. 641,025.

*To all whom it may concern:*

Be it known that I, PHILIP STEINBOCK, a citizen of the United States, formerly residing at New York, county and State of New York, and now residing at Amityville, Long Island, county of Suffolk, and State of New York, have invented certain new and useful Improvements in Self-Lubricating Dustproof Sewing Machines, of which the following is a specification.

This invention relates to improvements in self-lubricating, dust-proof sewing machines, particularly machines for sewing straw plait for straw hats, and for similar purposes.

It is the principal object of the invention to provide means whereby the bearings of such machines, which are usually high speed power driven machines, are automatical or self-lubricating for a long period, for instance for several days or weeks depending upon the amount of lubricant stored in the machine.

Another object of the machine is the provision of means for automatically oiling especially quick moving parts, which could not be oiled by direct application of the lubricant without the danger of splashing the oil, by means of oil-soaked cotton or waste wicks, or so-called fuses saturated with the lubricant.

A further object of the invention consists in providing a machine of the character specified which can be oiled by anyone or rather which is self-oiling and needs only the attendance of unskilled labor to effect its lubrication, thus saving expenses for skilled labor.

Other features of my improved machine will become apparent as the description thereof proceeds and will be more fully set forth hereinafter.

With these and other objects in view my invention consists in the combination and arrangement of parts shown in the accompanying drawings, and particularly pointed out in the appended claims, it being understood that changes in the form, proportion, and minor details may be made within the scope of the claims without departing from the spirit or scope of my invention or sacrificing any of the advantages of the invention.

In the accompanying drawings—

Fig. 2 is a top plan view thereof, taken along line 2—2 of Fig. 1.

Fig. 3 is an end view of the machine with right end wall removed, the section of the shaft being taken along line 3—3 of Fig. 1.

Fig. 10 is a top plan view of the frame after removal of the cover and machine parts, the oil chamber for the presser and needle bars being shown in section.

Fig. 11 shows, in detail views, the housings for the eccentric and shaft.

Fig. 12 is a sectional view, the section being taken on the line 12—12 of Fig. 10.

Fig. 13 is a detail view of one of the wick holders.

Corresponding parts in the several figures of the drawings are designated by like characters of reference.

Figure 1:
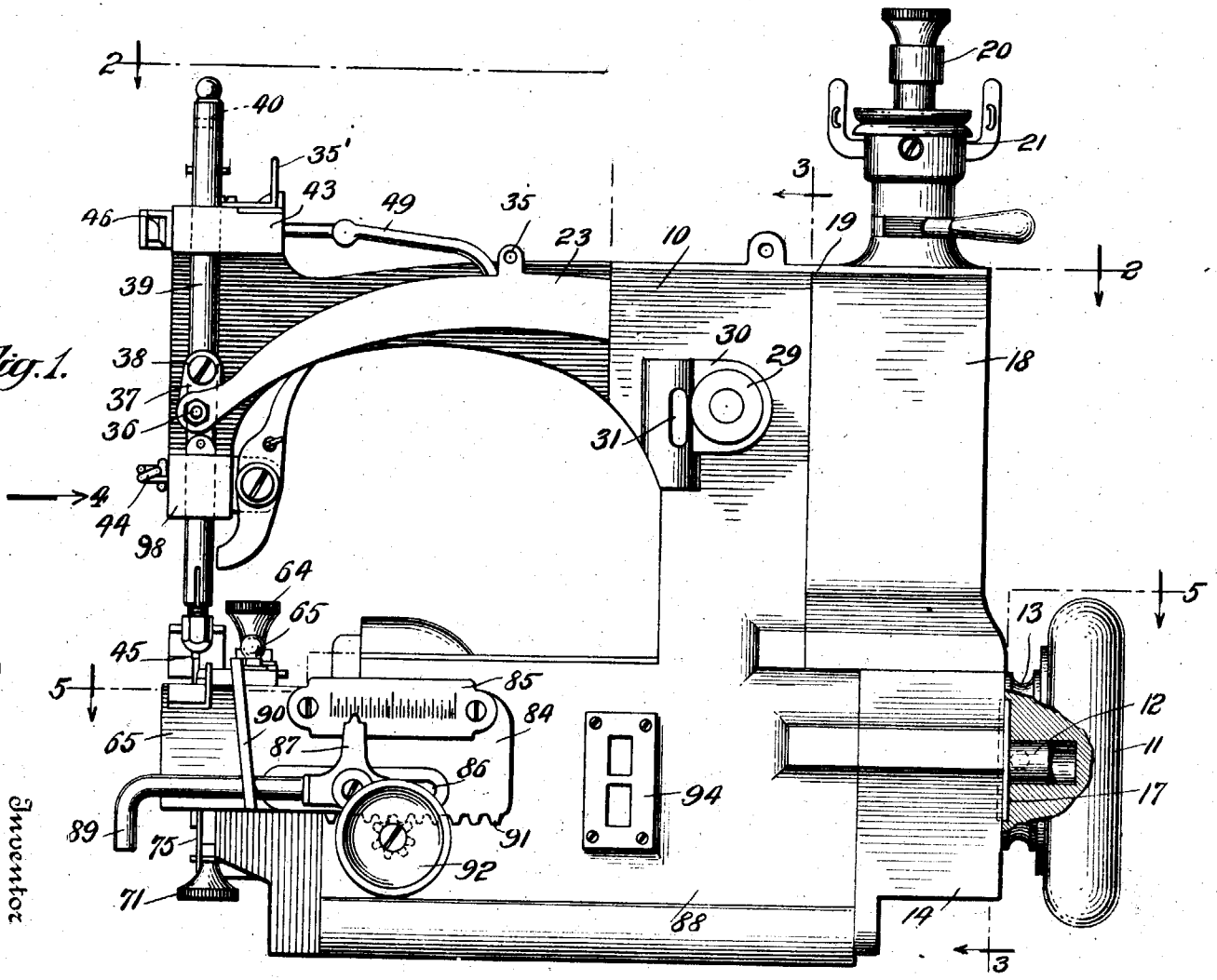
Figure 1 is a front elevation of my self lubricating sewing machine constructed according to the present invention.

The machine frame 10 is provided at one of its sides with the customary operating wheel 11, secured to an operating shaft 12 and integrally made with a belt pulley 13 on its inner face. (See Figs. 1, 2 and 14.) A cup 14 is provided on the side of the frame adjacent the pulley 13, adapted to be filled with oil or a lubricant, in which the customary eccentric 15 and the lower end of the pitman or connecting rod 16 are adapted to move, upon rotation of the shaft 12. The cup 14 is entirely closed against the intrusion of dust and to prevent the escape of the splashing of oil. A washer 17 is preferably provided on the shaft 12, between the wall of cup 14 and pulley 13, in order to prevent any leaking of the lubricant toward the out-side of the cup, at the place where the shaft 12 enters the cup or chamber 14.

The pitman 16 and its connections are incased in a dust proof casing 18 which is removably secured to the chamber 14. The casing 18 is closed at the top by a plate 19, carrying the tensioning device 20 and thread guide 21.

Figure 14:
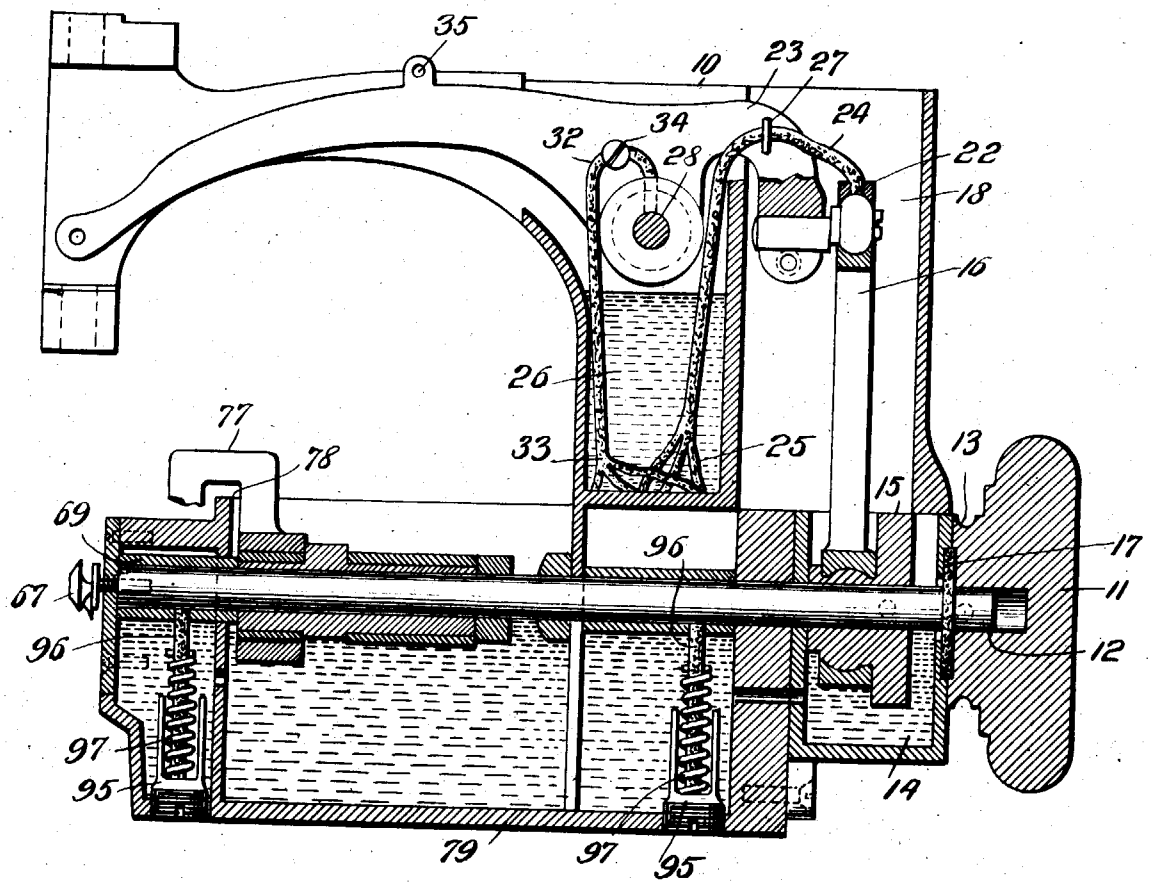
Fig. 14 is a front sectional view of the machine, the section being taken on line 14—14 of Fig. 2.

Within the casing 18 the upper end of the pitman 16 is pivotally secured, by the customary well known split bearing 22, to the inner end of the rocker arm 23, (see Fig. 14.)

This split bearing 22 has, in its upper edge, an opening for the reception of one end of a wick 24, the other end of which is untwisted as at 25, (Fig. 14) and depends into an oil chamber 26, an eye 27 being provided on the side of the rocker arm 23 to hold and guide the wick. The rocker arm 23 is provided with a suitable bearing, and is adapted to rock on a fixed rod or shaft 28 passing transversely through the chamber 26, and through the bore in said rocker arm, and having its ends extended through the walls of the chamber on both sides. The front and rear walls of the casing 10 (chamber 26) are each provided with a hole or bore, larger than the shaft 28, in which an annulus or sleeve 29 is mounted on the shaft 28, the sleeves fitting snugly in the sockets or bores in bosses 30, projecting from each wall, one of said bosses being extended and shaped on one side with an inner cavity to provide an oil gage 31. From the shaft 28, (see Fig. 14) there extends, through a hole in the bearing of the rocker arm 23, an oil supplying wick 32, one end of which engages said shaft, while the other, untwisted and branched end 33, extends into the oil reservoir 26, the wick being held intermediate its ends to the rocker arm 23 by means of a screw 34.

Figure 4:
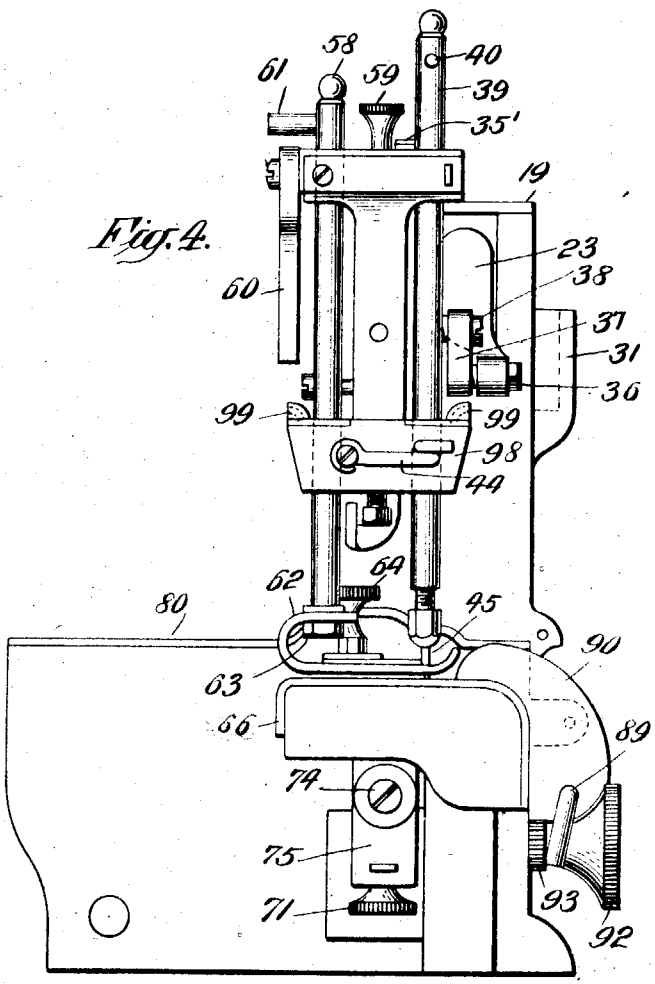
Fig. 4 is another end view of the machine seen from the left Fig. 1.

The rocker arm 23 is provided at its upper edge, intermediate its ends, with a thread guiding eye 35 and the front (or left) end of the arm 23 is pivotally attached, in the ordinary well known manner, as at 36 (Figs. 1 and 4), to an operating block 37 secured at 38 to the movable needle bar 39, intermediate the ends thereof. The needle bar is provided, at its upper end, with an eye 40 for the passage of the thread which is guided from the eye 35 to a guide 35′ and is then guided through a slot 41 of a bracket 42 secured to the side of an oil cup or reservoir 43. The thread finally passes through a guide 44 on the end of frame 10 to the needle 45 secured in the lower end of the needle bar, in the customary well known manner.

A thread tensioning device 46 has an inner projection 47 pressing the free end of a spring 48 against the thread, guided through the slot 41 of the bracket 42, while the other end of said spring is secured in the device 46.

A thread tension release rod 49 is pivotally secured to the rear of the rocker arm 23 and is made in two pieces which are adjustably connected, at their meeting ends, by means of a sleeve 50, integrally made with one of the pieces of the rod 49, and provided with a central hole through which the other piece of the rod is passed as at 51, while a fastening screw 52 is passed through the end of the sleeve into engagement with the adjustable piece of the rod 49, as best seen in Fig. 2.

The free outer end of the rod 49 is passed through the oil reservoir 43 into engagement with spring 48.

As shown in Fig. 10 the oil cup 43 has an inner oil receptacle 53, extending laterally from a block 54, formed integrally with the upper forward end of the overhanging arm of the frame 10, and is provided with passages for the needle bar and the presser bar. The block 54 is provided with ducts or holes 55, communicating from the oil receptacle 53 with the passages for the needle and presser bars, for the reception of wicks 56, 57, which are adapted to supply said needle and presser bars with oil.

The presser bar is designated at 58 and stands, as customary, under the tension of a spring, not shown, within the frame 10, the tension of which can be regulated by means of a screw 59 (Fig. 4), while the lifter 60 engages, with its upper shoulder, a pin 61 on the presser bar.

The presser bar carried, at its lower end, a foot 62, engaging, with its curved and forked rear end, a groove of the presser bar, the lower end of which carries a nut 63, holding the foot, with its curved part, to the presser bar.

The front part of the foot 62 is cut away to provide a passage for the needle 45, while a regulating screw 64, adapted to regulate the plait guard, can be locked in its adjusted position by means of a lever 65.

The throat plate 66 is provided with an opening for the passage of the needle, and underneath this opening, there is provided a lower, stitch forming device 67 (Fig. 5), having a cavity 68, for clearing the needle, the device 67 being secured to the outer, free end of the shaft 12, which is supported in a bearing 69.

Figure 8:
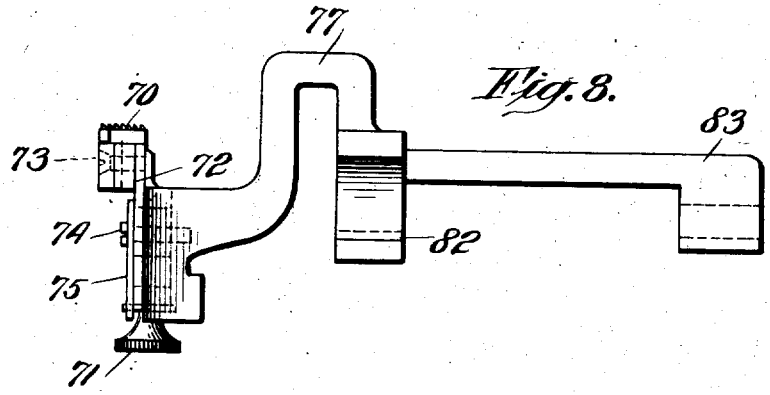
Fig. 8 is a detail view of a feed bar.
Figure 9:
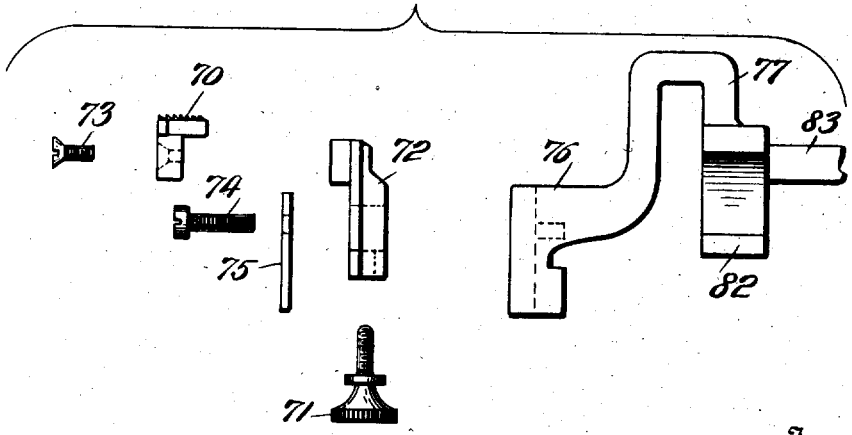
Fig. 9 is a detail view of the parts used for assembling the feed bar shown in Fig. 8.

In an opening in the throat plate 66, underneath and below the presser foot 62, a feeding device 70 is arranged, which can be raised and lowered against the presser foot by means of an adjusting screw 61 (Figs. 8 and 9), which is adapted to raise and lower a carrier plate 72, to which the feeding device 70 is secured by a screw 73. A screw 74 and plate 75 are provided for securing the entire adjustable feeding device, when the parts shown in Fig. 9 are assembled, as shown in Fig. 8, to the outer end of the feed bar arm 76; the latter having a U-shaped member 77, adapted to straddle the side wall 78 (Fig. 14) of a casing or box 79, forming an oil reservoir, adapted to be filled with oil, and closed on top by a cover 80, secured, upon the side and end walls thereof, by means of screws 81 (Fig. 2). Within this reservoir, the straddle member 77 of the feed bar is made integral with a vibrating arm 82, the forked end of which engages an eccentric on the drive shaft 12. The feed bar, comprising the arm 76, member 77 and arm 82, is provided with a lateral bracket arm 83, pivotally secured to the upper end of a rock frame pivoted at the bottom of the reservoir 79, as more particularly described hereinafter.

A plait guide and regulator of well known construction, generally indicated at 84, is provided at the front part of the machine and comprises a sliding index plate 85 provided with a longitudinal slot 86, through which the stem of an index finger 87 extends, the latter being secured to the casing or front wall 88 of the oil reservoir 79, by a screw which holds the index plate in frictional engagement with the wall 88. A guide arm 89, extending from an ear on the index finger 87, is provided for guiding the plait and holding the material against the plait guiding plate 90, the latter being part of the index plate 85. The lower part of the plate 85 is provided with teeth 91 adapted to be engaged by the teeth of a gear 93, on the shaft of an operating knob 92, adapted to displace the index plate, in order to regulate the distance of the rows of stitches on each plait.

The front plate 88 of the oil reservoir 79 is provided with an oil gage 94, to indicate the level of the oil within the reservoir 79. As shown in Figs. 12, 13 and 14, wick holders 95 are provided, at the bottom of the reservoir 79, in which wicks 96 are held, by springs 97, with their upper ends in engagement with the shaft 12, in order to permanently supply oil to the same if the level of the oil contained within the reservoir 79 has sunk below the level of said shaft.

Intermediate their ends the presser bar 58 and the needle bar 39 are guided through an oil receptacle 98 (Fig. 4) provided with front and rear cups 99.

Figure 5:
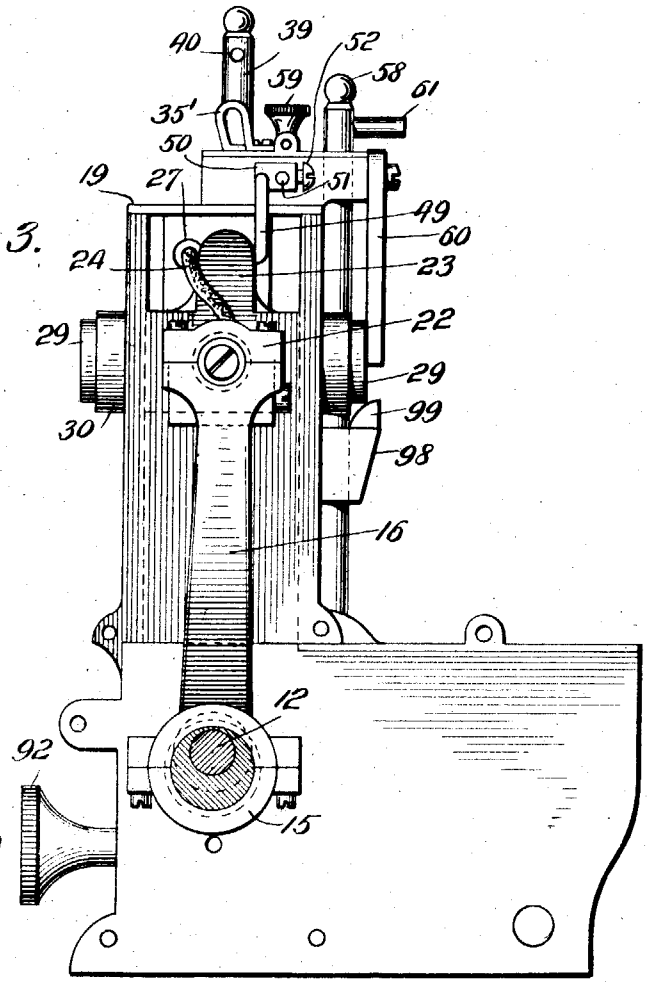
Fig. 5 is a top plan view partly in section along line 5—5 of Fig. 1.
Figure 5:
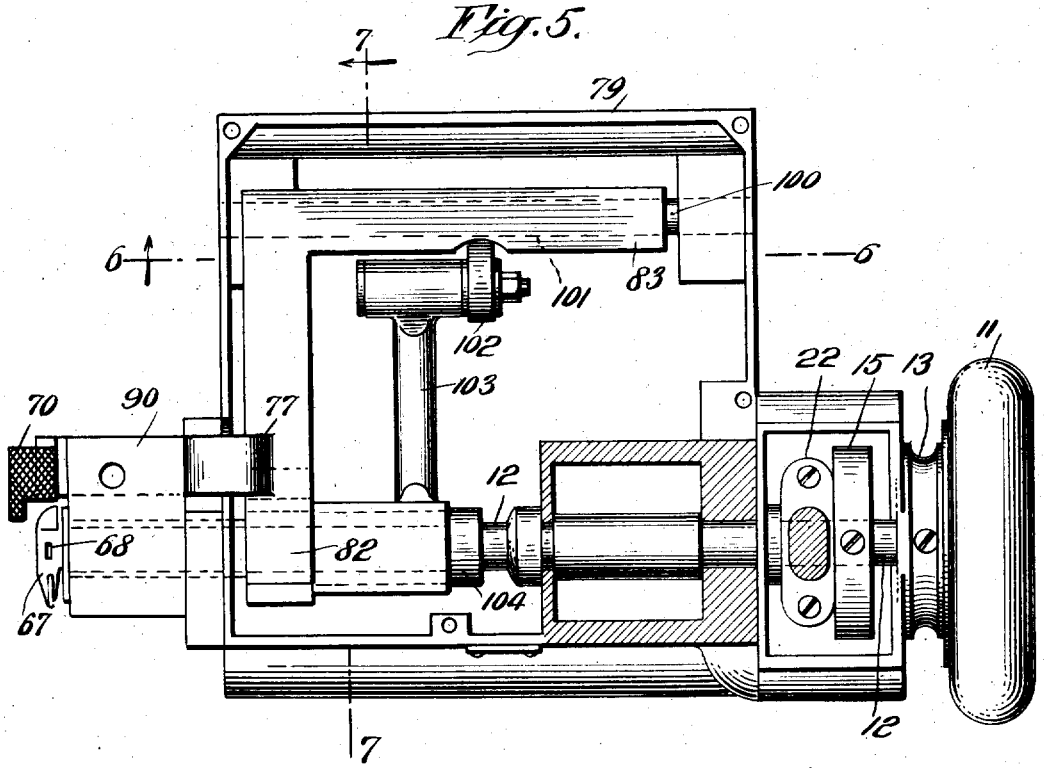
Figure 6:
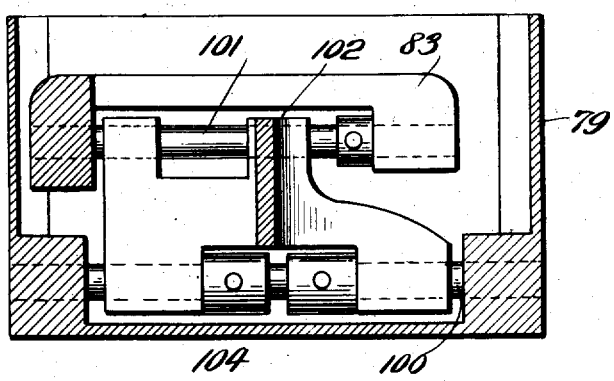
Fig. 6 is a sectional view, the section being taken along line 6—6 of Fig. 5.
Figure 7:
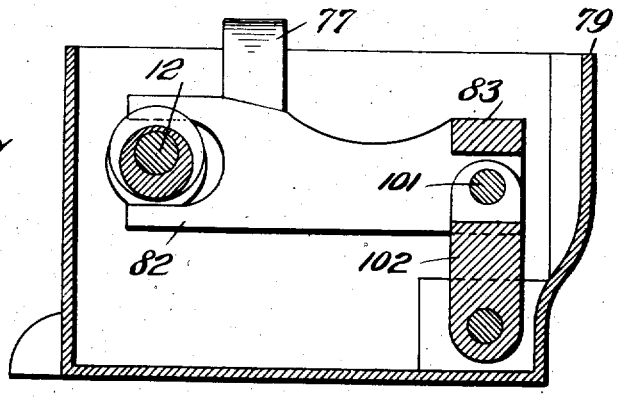
Fig. 7 is a sectional view, the section being taken along line 7—7 of Fig. 5.

As shown in Figs. 5 and 6, the oil reservoir 79 contains the actuating devices for the feed bar, including the bracket arm or frame 83, which is pivotally supported on a rod or shaft 101, at the upper end of a rock frame 102 adapted to rock on a shaft 100, located near the bottom of the oil reservoir 79 (Fig. 6). One end of a connecting rod 103 is pivotally connected with the rock frame 102, the other end thereof being carried on an eccentric sleeve 104, secured to the shaft 12. The connecting rod 103 is provided with suitable openings to receive oil.

The operation of the oiling features of the machine may be briefly summarized as follows:—

When the power shaft 12 is rotated, the eccentric 15 in the oil cup or well 14 is lubricated by the oil therein, while the connecting bearing between the pitman 16 and the rock arm 23 is lubricated by a wick supplying oil to the bearing in the box 22, the oil being conducted thereto through the wick by capillary action, from a well or oil cup located below the level of the bearing. Similarly the bearing of the rocker arm 23 on the shaft 29 is lubricated by capillary action of the oil rising from the oil well or cup 26 through a wick. The bearings for the shaft 12 are lubricated by oil from the reservoir 79 located in the base of the machine, wicks being provided for carrying the oil to the bearings when the level thereof in the reservoir is below the shaft. The reservoir 79, which, as shown in the drawings, extends to the rear of the machine, encloses the eccentrics and actuating mechanisms for the feed bar, which, when the reservoir is nearly filled with oil, are nearly completely submerged. When these parts are operated by the rotation of the shaft 12, the splash of the oil will be sufficient to thoroughly lubricate all of the moving parts. The cover plate 80 for the reservoir 79 prevents the splashing oil from escaping from the reservoir.

Having thus described my invention, what I claim and desire to secure by Letters Patent of the United States is:—

1. In a sewing machine of the character described, the combination of a pitman, an oil receptacle, a split-bearing for the pitman of the machine having an opening, and a wick entering the opening in said bearing and extending with its free end into said oil chamber, and means for guiding said wick intermediate its ends.

2. In a sewing machine of the character described, the combination with an oil containing reservoir, of a rocker arm, a shaft passed transversely through said reservoir and on which said arm is pivoted, said shaft having its ends extended through the walls of the reservoir on both sides thereof, and a sleeve on each end of said shaft, and a projecting portion of the wall of the reservoir adjacent one of said sleeves provided with a sight opening and constituting an oil gage for indicating the level of the oil within said reservoir.

3. In a sewing machine of the character described, the combination with an oil containing reservoir, of a rocker arm, a shaft passing transversely through said reservoir on which said arm is pivoted, a wick engaging said transverse shaft and extending into the oil within said reservoir, and means for guiding said wick intermediate the ends thereof.

4. In a sewing machine of the character described, the combination with the needle and presser bars thereof, of an oil cup, a chambered block on said cup for the passage of the needle and presser bars, said block being provided with channels connecting said cup with the passages of the needle and presser bars and wicks in said cup entering said channels for engaging said presser and needle bars.

5. In a sewing machine of the character described, the combination of an oil reservoir forming part of the machine casing, an operating shaft of the machine passed through said oil reservoir, rocker elements connected with said shaft and located within said reservoir, a fabric feeding device, means connecting said rocker elements with said feeding device, and an oil gage in the front wall of said reservoir, for indicating the level of the oil contained therein.

6. In a sewing machine of the character described, the combination of an oil reservoir, an operating shaft passed through said reservoir, a plurality of wick holders at the bottom of said reservoir, springs in said holders, and wicks held in said springs adapted to engage said shaft with their upper free ends for lubricating the same even if the oil level within said reservoir has fallen below said shaft.

7. In a sewing machine of the character described, the combination with the frame of the machine, of needle and presser bars, an oil receptacle intermediate the ends of said needle and presser bars, and oil cups at the front and rear ends of said receptacle.

8. In a sewing machine of the character described, the combination with a main frame provided with an overhanging arm and a base member, of an oil reservoir formed in the base of said frame, a main shaft passing through said reservoir, bearings in the walls of said reservoir for said shaft, and means for oiling said bearings from the oil in said reservoir, said means including wicks for conducting oil to the bearings when the level of the oil is below said shaft.

9. In a sewing machine of the character described, the combination with a main frame, provided with an overhanging arm and a base member extending laterally below said arm, of an oil reservoir formed in the base of said frame below said arm, said reservoir extending rearwardly, a main operating shaft passing through said reservoir at the front thereof, a rock frame pivotally mounted in said reservoir near the rear wall thereof, a feed bar actuated by said rock frame, a connecting rod for rocking said rock frame, eccentrics mounted on said shaft for actuating said feed bar, all of said parts being located within said reservoir and adapted to be lubricated by the oil therein, and a removable cover plate for said reservoir adapted to permit access thereto and for preventing oil from splashing out of the reservoir.

10. In a sewing machine of the character described, the combination with a main frame, provided with an overhanging arm and a base member, of a rocker arm pivotally mounted on said frame and extending parallel with said overhanging arm, an oil well located below the rocker arm pivot and within the frame and a wick of porous material for conducting oil by capillary action upward from the well for lubricating said pivot.

11. In a sewing machine of the character described, the combination with a main frame, provided with an overhanging arm and a base member, of a rocker arm pivotally mounted on said main frame, a pitman pivotally connected with the end of said rocker arm, an oil well located below said rocker arm, and a wick of porous material for conducting oil by capillary action from said well upward for lubricating the pivotal connection between said rocker arm and the pitman.

12. In a sewing machine of the character described, the combination with a main frame, provided with an overhanging arm and a base member, of a rocker arm pivotally mounted on said main frame, a driving shaft extending through said base member and provided with an eccentric, a pitman extending from said eccentric upward and pivotally connected with said rocker arm, an oil cup enclosing the lower end of the pitman and said eccentric for lubricating the same, and a casing enclosing said pitman and its connections for excluding dust therefrom.

PHILIP STEINBOCK.